Aug. 29, 1967 M. RACHOFSKY 3,337,970

CALCULATING DEVICE

Filed July 14, 1965 2 Sheets-Sheet 1

INVENTOR

Morton Rachofsky

BY Giles C. Clegg Jr.

ATTORNEY

INVENTOR
Morton Rachofsky
BY Gil C Clegg Jr.
ATTORNEY

United States Patent Office 3,337,970
Patented Aug. 29, 1967

3,337,970

CALCULATING DEVICE

Morton Rachofsky, 5424 Park Lane, Dallas, Tex. 75220

Filed July 14, 1965, Ser. No. 463,473
11 Claims. (Cl. 35—33)

ABSTRACT OF THE DISCLOSURE

There is disclosed in the specification and drawings a calculating device or count indicating device which uses a binary system for displaying decimal numbers. In accordance with one specific example of the invention, there is provided a frame member having wires on which moveable members can move. Vertical partition members are provided for dividing the horizontal members such that one moveable member is positioned on each of the horizontal members between each of the vertical members. There is thus provided a plurality of vertical columns each consisting of four horizontally moveable elements vertically arrayed in a single line. When the moveable element is positioned to the right, it represents a binary zero, and when positioned to the left, it represents a binary one. Decimal digits are therefore represented in binary form by the position of the moveable elements. The moveable elements have indicia associated with them with each of the elements being represented by one of the digits 1, 2, 4 and 8. The sum of the indicia blocks in the left position will be the same decimal number as represented in binary form by the position of the moveable members. Similar effect is obtained in accordance with another specific embodiment of the invention disclosed wherein a plate member is provided and moveable elements move between the vertical separating members along grooves formed in horizontal members. In this specific example of the invention, the values associated with the moveable blocks are painted on the plate member such as to be covered when the moveable members are in the position representing a binary "zero" and exposed when the moveable members are in the position representing a binary "one."

In the everyday use of mathematics, most calculations are used in a decimal system. This system encompasses the numbers from 0 to 9, any combination of which may be used to express any number of any magnitude. In other phases of mathematics, other systems may be used. For example, computers use a system called the binary system in which there are only two numbers, the 0 and 1. The binary system is used because it is very simple to rapidly calculate using the two numbers in the system and the system readily lends itself to use in electronic equipment. The calculating device of the present invention takes advantage of both systems and computation of decimal numbers may be readily accomplished by the addition or subtraction of the numbers in binary form, although no knowledge of the binary number system is necessary to operate the calculating device. Moreover, the device may be used to teach a binary system as well as a decimal system.

In accordance with the principles of the present invention, there is provided a plurality of arrays of moveable members, each of the arrays suitably having at least four movable members. Each of the movable members can be set in either a first or a second position. Each of the arrays of members represents a binary word, each of the movable members representing one of the bits of the binary word. Each of the binary words when transformed into the decimal system represents the value of a digit of a decimal number. The number of arrays provided can vary dependent upon the number of digits of a decimal number which it is desired to display. Numbers are entered into the device by moving the movable members. The sum or difference or combination of the sum and difference of a series of numbers may be calculated using the device with the final sum being indicated upon the device by the position of the members after each number has been entered into the device.

In accordance with the preferred embodiment of the invention, there is provided a frame divided into a number of vertical columns. Each vertical column has four blocks which are slidably mounted between one of two positions within the vertical column. One of the movable members in each of the vertical columns is assigned a value of the decimal digit 1. A second one of the movable members in each of the vertical columns is assigned the decimal digit 2, a third of the movable members in each vertical column is assigned a value equal to the decimal digit 4, and the fourth movable member in each vertical column is assigned the decimal digit 8. It is therefore possible to either enter or subtract any decimal digit from any column. Preferably, the members representing the digits 1, 2, 4 and 8 are each of different color. Also, the digit associated with each of the blocks is suitably either imprinted on the block or imprinted on a member underlying the blocks such that the digit is exposed when the member is moved into position signifying that the digit has been entered.

Many objects and advantages of the invention will become apparent to those skilled in the art as the following detailed description of the same unfolds when taken in conjunction with the appended claims and attached drawings in which like reference numerals denote like parts and in which:

Figure 1:
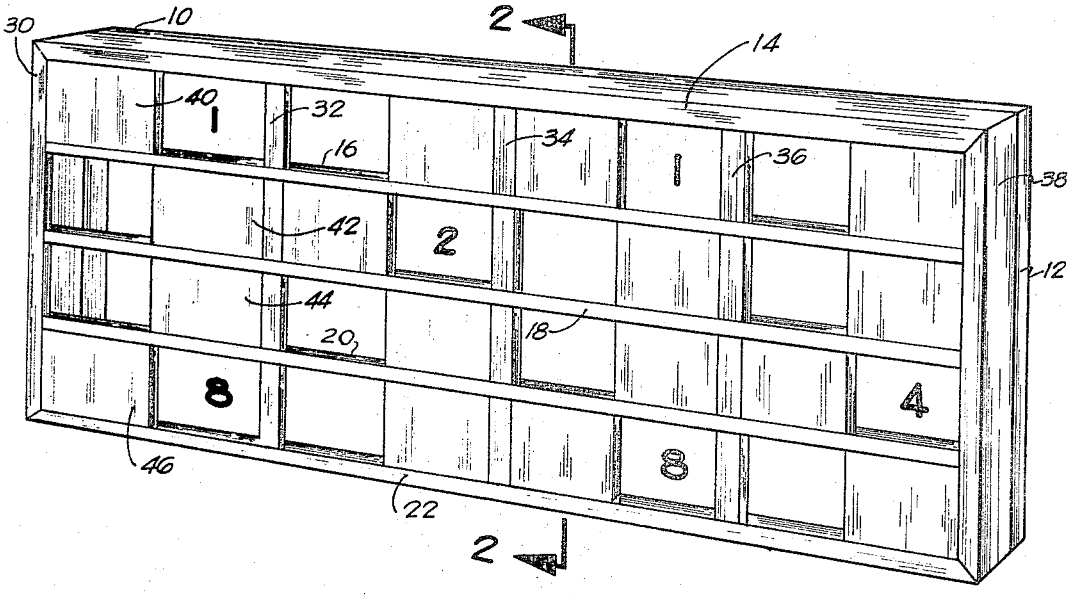
FIGURE 1 is a perspective view illustrating one preferred embodiment of the invention.
Figure 2:
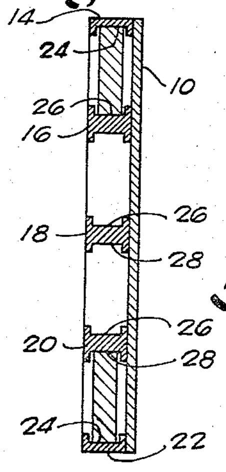
FIGURE 2 is a view taken along line 2—2 of FIGURE 1.

Turning now to FIGURES 1 and 2 of the drawings, the calculating device of the present invention in accordance with a preferred embodiment thereof is represented generally by the reference numeral 10. It comprises a plate member 12 of rectangular configuration having five horizontally disposed elongated members 14, 16, 18, 20 and 22 extending across one face thereof. The members 14–22 are equally spaced from one another and parallel. The members 14 and 22 each have a single groove 24 formed therein, with the grooves 24 each facing toward members 16 and 20 respectively. Members 16, 18 and 20 each have grooves 26 and 28 formed in opposite sides thereof with each of the grooves 26 and 28 facing toward an adjacent one of the elongated members.

Vertically disposed members 30, 32, 34, 36 and 38 are also provided. The vertical members intersect the grooves of the horizontally disposed members providing, in the specific example shown, four vertical arrays. Each of the vertical arrays comprises four block members 40, 42, 44 and 46, each of which move in the slots formed in the horizontally disposed members. The separation between adjacent pairs of vertically disposed members is substantially twice the length of one of the members 40–46 such that the movable members can be moved between first and second positions.

Each of the members 40, 42, 44 and 46 are suitably of different color to facilitate recognition of individual blocks and underlying each of the members when the member is in the rightmost position is indicia to indicate the digital value assigned to the block when the block is moved to the leftmost position. Thus, in the form shown, the block 40 is associated with the digital number 1, the block 42 is associated with the digital number 2, block 44 is associated with the digital number 4, and block 46 is associated with the digital number 8. Any number from 0 to 15 may be entered into each of the columns by moving the appropriate blocks from the rightmost position to the leftmost position, although at the end of computation, appropriate adjustment should be made to reduce the value of the digital numbers entered in each column to a value less than 10.

The array at the right side of the computer is utilized for displaying the least significant digit of a number. If only whole numbers are to be utilized, the rightmost column or array would conventionally be the units column. If the rightmost column is the units column, the next column to the left would be associated with the tens digit, the third column from the right would be associated with the hundreds digit, and the fourth column from the right would be associated with the thousands digit. As many columns as are required to display a number can be provided.

Although each movable member has a decimal number associated therewith, by sliding the member to the left, the number is also entered in binary form. When one of the members 40–46 is in the right position, a binary 0 is represented and when one of the members is in the left position, a binary 1 is represented. The decimal numbers 0–15 are shown in Table I with their binary equivalent indicated therein to illustrate the correlation between entering of a number in decimal form and the entering of a number in binary form.

TABLE I

| Digital Number | Binary Word | Digital Number | Binary Word | Digital Number | Binary Word |
|---|---|---|---|---|---|
| 1 | 0001 | 6 | 0110 | 11 | 1011 |
| 2 | 0010 | 7 | 0111 | 12 | 1100 |
| 3 | 0011 | 8 | 1000 | 13 | 1101 |
| 4 | 0100 | 9 | 1001 | 14 | 1110 |
| 5 | 0101 | 10 | 1010 | 15 | 1111 |

For example, if only the block 46 of one of the columns is in the left position, a decimal 8 is shown. By reading the blocks from bottom to top, the binary word 1000 is indicated. As shown in Table I, the binary word representing the decimal digit 8 is 1000.

To further illustrate, if the blocks 40 and 44 were moved to the left position will blocks 42 and 46 remaining in the right position, the decimal number 5 would be entered, the sum of 1 and 4 is indicated by the indicia exposed when the blocks are moved. Reading from bottom to top, the binary word 0101 would be presented since the right position of block 46 would represent a binary 0, the left position of block 44 would represent a binary 1, the right position of block 42 would represent binary 0 and the left position of block 40 would represent a binary 1. Referring a Table I, a decimal 5 can be represented by the binary word 0101. Thus, it can be seen that the entering of a number in decimal form, that is the sum of the digits associated with the blocks moved to the left position, also enters the number in binary form.

Figure 3:
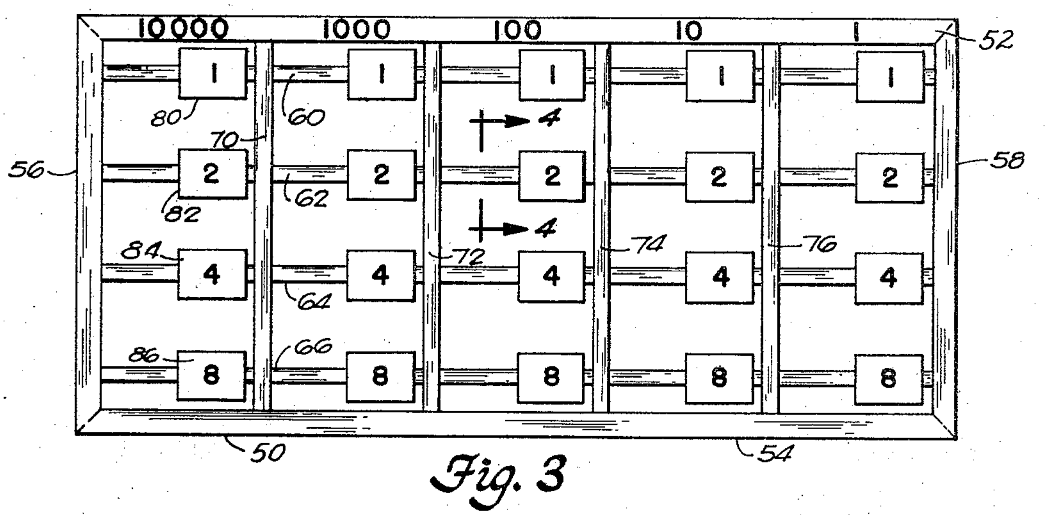
FIGURE 3 is a plan view illustrating the second embodiment of the invention.
Figure 4:
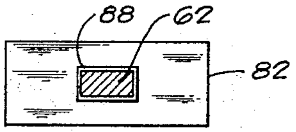
FIGURE 4 is a view taken along line 4—4 of FIGURE 3 illustrating the movable member utilized in accordance with the second embodiment of the invention.

Turning now to FIGURES 3 and 4 of the drawings, still a second embodiment of the invention, designated generally by the reference character 50, is shown. The embodiment of the invention shown in FIGURES 3 and 4 of the drawings can be seen to comprise a rectangular frame comprising horizontally disposed members 52 and

54 and vertically disposed members 56 and 58. There is also provided four horizontally disposed wire members 60, 62, 64 and 66 which extend between the vertically disposed members 56 and 58. Members 60–66 are parallel to one another and substantially equidistant from one another. The members 60–66 are preferably of rectangular cross section as shown in FIGURE 4.

There is also provided vertically disposed members 70–76 which cross the horizontally disposed members 60–66 for purposes of dividing each of the horizontally disposed members into five portions of substantially equal length. Four blocks 80–86 move on the horizontal members 60–66, respectively, between each adjacent pair of vertically disposed members, providing vertical arrays of members which are movable between first and second positions, in much the same manner as that described with reference to FIGURES 1 and 2 of the drawings. It will be noted that each of the blocks 80–86 has a decimal digit imprinted thereon indicating the value associated with each block in accordance with this embodiment of the invention.

As best shown in FIGURE 4 of the drawings, each of the blocks, such as the block 82, has an aperture passing therethrough which is of rectangular cross section and only slightly larger than the horizontally disposed member on which the block moves. This is important if the members 80–86 are each to have a decimal digit representing its value imprinted thereon in order that the indicia will always face the operator. However, it is to be noted that the horizontally disposed members can be of other configurations, such as round in cross section, if the movable members are not to have the decimal value associated therewith imprinted thereon. It will also be noted that the separation between adjacent vertical members is suitably at least twice the length of the movable member in order that each movable member can move between first and second positions.

Figure 5:
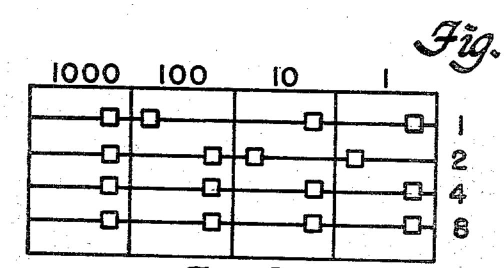
FIGURES 5–9 are functional drawings of the computing device showing various steps in the operation of the device when several numbers are added and subtracted together.
Figure 6:
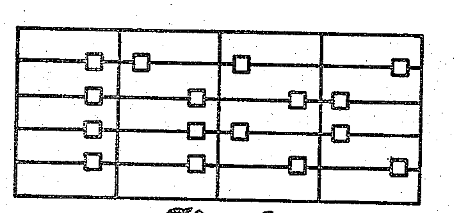
Figure 7:
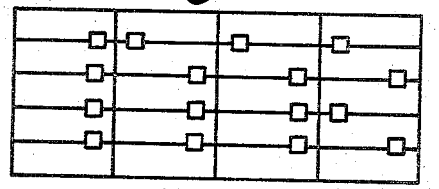
Figure 8:
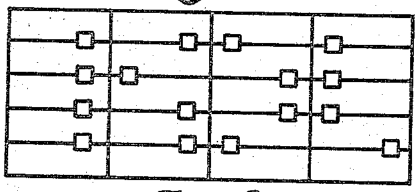
Figure 9:
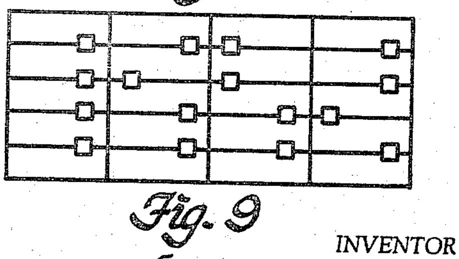

Turning now to FIGURES 5–9 of the drawings, the actual manipulation of the calculating device in the working of a problem is shown, the problem being $122+34-41+182-63=234$. The number 122 is entered as shown in FIGURE 5. Each number of each decimal position is entered into the appropriate column. For example, the number 2 in the units column is entered by sliding the block 42 to the left, the 2 is entered in the tens column by sliding the block 42 to the left and the number 1 is entered in the hundreds column by sliding the block 40 to the left. To add 34, 4 is entered in the units column by sliding the member 44 to the left and 3 is entered in the tens column by adding 5 and subtracting 2. This is accomplished by moving blocks 40 and 44 of the tens column to the left and moving member 42 of the tens column to the right. FIGURE 6 shows the result of this manipulation. The next step in solving the problem is to subtract 41. 1 is subtracted from the units column by subtracting 2, by moving member 42 to the right and by adding 1 by moving the member 40 to the left. 4 is subtracted from the hundreds column by moving member 44 to the right. FIGURE 7 shows the computer after subtracting 41. To add 182, as shown in FIGURE 8, 2 is added to the units column by moving member 42 to the left, 8 is added to the tens column by moving member 46 to the left and 1 is added to the hundreds column by the process of adding 2 and subtracting 1. Thus, member 40 is moved to the right and member 42 would be moved to the left. The final step in solving the problem is to subtract 63. As illustrated in FIGURE 9 of the drawings, 3 is subtracted by moving the members 40 and 42, whose total value is 3, to the rightmost position. 6 is subtracted from the tens column by subtracting 8, an operation accomplished by moving the member 46 to the right and adding 2, an operation accomplished by moving member 42 to the left. The answer to the problem, as displayed in FIGURE 9, is 234.

The operation of the invention described with reference to FIGURES 5–9 of the drawings is relatively simple in that at no time did the total value to be entered in any of the columns exceed 10. It will be noted that if the number in any column is over 9, it may be placed in the calculating device by subtracting 10 from the number and adding 1 into the next higher decimal plate column. In simple addition, this is known as a carry. However, one of the advantages of the present invention is that numbers greater than 10 may be entered into a column without the necessity of performing the carrying operation. This greatly facilitates the operation of the device when a series of small numbers is to be added and subtracted.

Figure 10:
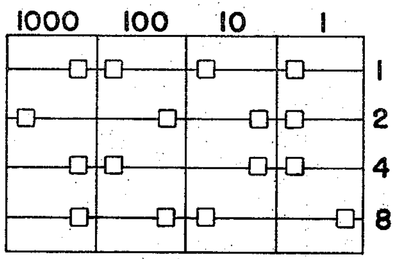
FIGURES 10–14 are functional drawings of the computing device further illustrating the manner in which the device is operated in the course of working a problem using the device.
Figure 11:
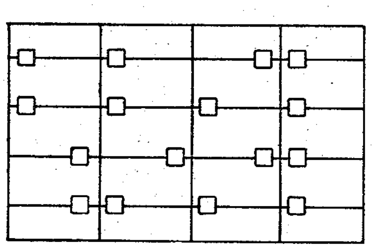
Figure 12:
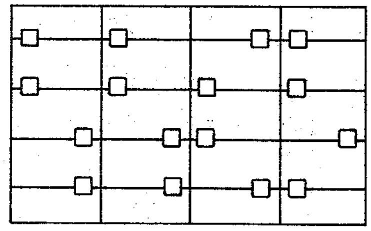
Figure 13:
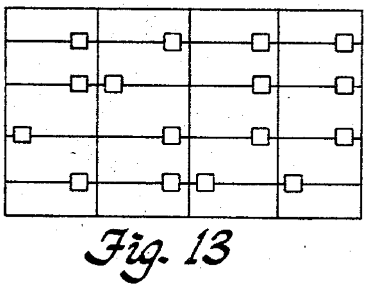
Figure 14:
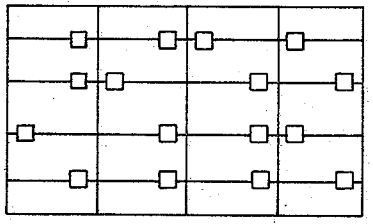

Turning now to FIGURES 10–14 of the drawings, the operation of the device in the course of solving a more complex problem is shown. The problem to be solved is 2,597+1,618−844+917=4,288. The number 2,597 is entered into the device as shown in FIGURE 10. Thus, members 40, 42 and 44 of the units column are moved to the left, member 46 remaining in the right position to enter a 7. 9 is entered in the tens column by moving members 40 and 46 to the left with members 42 and 44 remaining in the right position. 5 is entered into the hundreds column by moving members 40 and 44 to the left with members 42 and 46 remaining in the right position, and 2 is entered in the thousands column by moving members 42 to the left with members 40, 44 and 46 remaining in the right position. To add the number 1,618, the member 46 of the units column is moved to the left for the purpose of adding 8 to the units column, 1 is added to the tens column by the process of adding 2 and subtracting 1. This is physically accomplished by moving the member 42 to the left and moving the member 40 to the right. 6 is added to the hundreds column by adding 10 and subtracting 4. This is physically accomplished by moving the members 42 and 46 to the left and moving the member 44 to the right. In the thousands column 1 is added by adding 1, physically accomplished by moving the member 40 to the left. The result of performance of the above steps ancillary to addition of 1,618 is shown in FIGURE 11. The next step in solving the problem is the subtraction of 844 as shown in FIGURE 12 of the drawings. To subtract 4 from the units column, the member 44 is moved to the right. To subtract 4 from the tens column, the member 46 is moved to the right, subtracting 8, and member 44 is moved to the left, adding 4. To subtract 8 from the hundreds column, the member 46 of the hundreds column is moved to the right. The last step in solving the problem is to add 917. To add 7 to the units column, 3 is subtracted by moving the members 40 and 42 to the right and 10 is added by adding 2 rather than 1 to the tens column. 2 is added to the tens column by adding 8 and subtracting 6. As shown in FIGURE 13 of the drawings, this is physically accomplished by moving member 46 to the left and moving members 42 and 44 to the right. 9 is added to the hundreds column by subtracting 1 from the hundreds column and adding 1 to the thousands column. The answer to the problem as indicated in FIGURE 13 is 4,288. It will be noted that in performing the last computation, illustrated in FIGURE 13, the carrying operations have been performed in order that the answer to the problem can be observed in conventional form. However, in the course of solving the problem, in several instances the sum of the numbers displayed in any column was greater than 10. For example, in FIGURE 11, the sum of the numbers displayed in the units column was 15, the sum of the numbers displayed in the tens column was 10, and the sum of the numbers displayed in the hundreds column was 11. If it were desired to read the answer of the first addition, the answer displayed in FIGURE 11 should be transformed to that shown in FIGURE 14. Thus, in the units column, 10 would be subtracted from the display of FIGURE 11 by moving members 42 and 46 to the right. Since 10 has been subtracted from the units column, 1 should be added to the tens column by moving member 40 to the left and 10 subtracted from the tens column by moving members 42 and 46 to the right. When members 42 and 46 of the tens column are moved to the right, an additional 1 should be added to the thousands column and 10 subtracted from the hundreds column. This is accomplished by moving the members 40 and 46 to the right and adding 1 to the thousands column by moving member 44 to the left 40 and 42 to the right. As a result of the above manipulations, the value displayed in the thousands column would be 4, the value displayed in the hundreds column would be 2, the value displayed in the tens column would be 1, and the value displayed in the units column would be 5. The correct solution to the sum of 2,597+1,618 would therefore be displayed, namely 4,215.

The above examples in addition and subtraction have been kept relatively simple in order to better explain the operation of the device. However, longer series and larger numbers may be added and subtracted together with the same ease with which the simpler numbers are added and subtracted. Columns representing higher decimal places such as tens of thousands and hundreds of thousands may be utilized, or if numbers do not reach that magnitude, these numbers are ignored and represent 0.

Although the invention has been shown and described with reference to certain preferred embodiments and specific examples, many changes and modifications which will become apparent to those skilled in the art may be made without department from the scope of the invention as defined in the appended claims.

What I claim is:

1. A count indicating device comprising a plurality of vertical columns each consisting of a plurality of elements vertically arrayed in a single line, means supporting each of said elements for movement between two horizontal positions, and vertical partition members separating each of said columns and limiting the horizontal movement of each of said elements, each of said columns representing a different decimal digit of a decimal number, each of said elements representing a binary bit, the combination of elements in a column representing in binary form the decimal digit.

2. A count indicating device as defined in claim 1 wherein each of said columns comprises four vertically arrayed elements, each of said elements representing a different one of the value 1, 2, 4 and 8 and when combined arithmetically representing in binary form the decimal digit of a decimal number.

3. A manual calculating device comprising a plurality of movable blocks, said blocks being arranged in a plurality of vertical columns, each column containing four blocks and representing a different decimal place in a decimal number, means supporting each of said blocks for movement horizontally between two positions each of the four blocks aligned vertically in any one column being a binary bit such that any number between 0 and 15 may be represented by the combination of positions of the four blocks as a binary word and means for separating each of said columns along vertical lines and limiting the horizontal movement of each of said blocks.

4. A calculating device comprising a frame, horizontal wire members, vertical partition members and a plurality of blocks, each of said blocks slidably mounted on said horizontal wire members and confined by said vertical partition members to form a plurality of vertical columns within said frame, each of said vertical columns representing a different decimal place of a decimal number and having four vertically arrayed blocks therein movable between two positions in said vertical column, each of said four blocks being assigned a different one of the numbers 1, 2, 4 and 8, the combination of said blocks forming in binary code the decimal number of the decimal place represented by the vertical column.

5. A calculating device as defined in claim 4 wherein each of said four blocks is of a different color.

6. A calculating device as defined in claim 4 wherein each of said four blocks has marked thereon a different one of the numbers 1, 2, 4 and 8.

7. A calculating device as defined in claim 4 wherein said wire members are each of rectangular cross section and each of said blocks has an opening extending therethrough of rectangular cross section for receiving one of said wire members.

8. A calculating device comprising a plurality of elongated horizontally disposed members, said horizontally disposed members being substantially parallel to one another and spaced apart from each other, a plurality of vertical columns each comprising a plurality of moveable members vertically arranged in a single line, a plurality of vertical partition means intersecting each of said horizontally disposed members at spaced apart locations and separating said columns, each of said moveable members being moveable along slots formed by said horizontally disposed members between first and second horizontal positions established by said vertical partition means, each of said columns representing a different decimal digit of a decimal number, each of said moveable members representing a binary bit.

9. A calculating device as defined in claim 8 wherein each of said columns includes four of said movable members, each of said movable members in an array representing a different one of the numbers 1, 2, 4 and 8.

10. A calculating device as defined in claim 8 wherein the portions of said horizontally disposed members between said vertical partition means have grooves formed in opposing sides thereof for slidably receiving opposed edges of said movable members.

11. A calculating device as defined in claim 9 further including a plate member along which said horizontally disposed members and vertical partition means extend and wherein the numbers 1, 2, 4 and 8 of each array are marked on said plate at a position to be covered by the associated movable member when the movable member is in one position and exposed when the movable member is in the second position.

References Cited

UNITED STATES PATENTS

| | | | |
|---|---|---|---|
| 2,733,009 | 1/1956 | Forbes | 35—33 X |
| 2,764,822 | 10/1956 | Gurevitch | 35—33 |
| 2,857,686 | 10/1958 | Blake | 35—33 |
| 3,071,320 | 1/1963 | Scott. | |

EUGENE R. CAPOZIO, *Primary Examiner.*

W. H. GRIEB, *Assistant Examiner.*